Sept. 9, 1969  C. SHULOCK ET AL  3,465,769
GOVERNOR TRIP VALVE WITH TEMPERATURE COMPENSATION MEANS
Filed Oct. 2, 1967
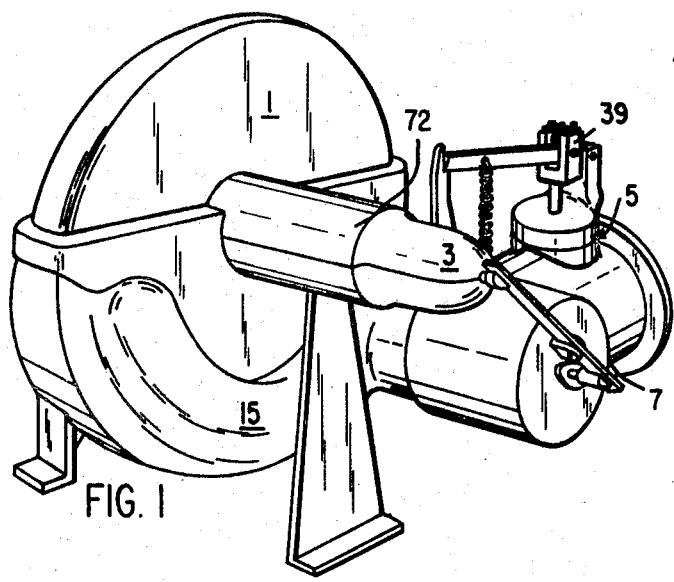
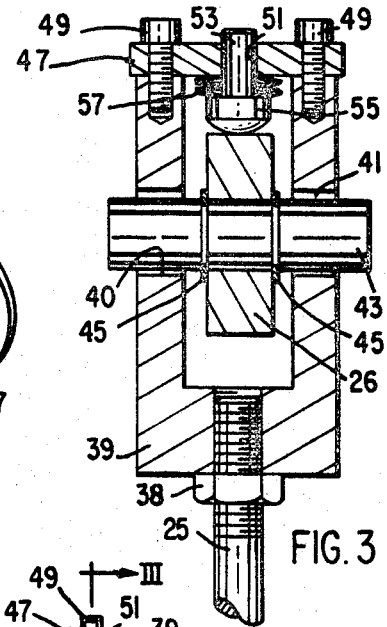
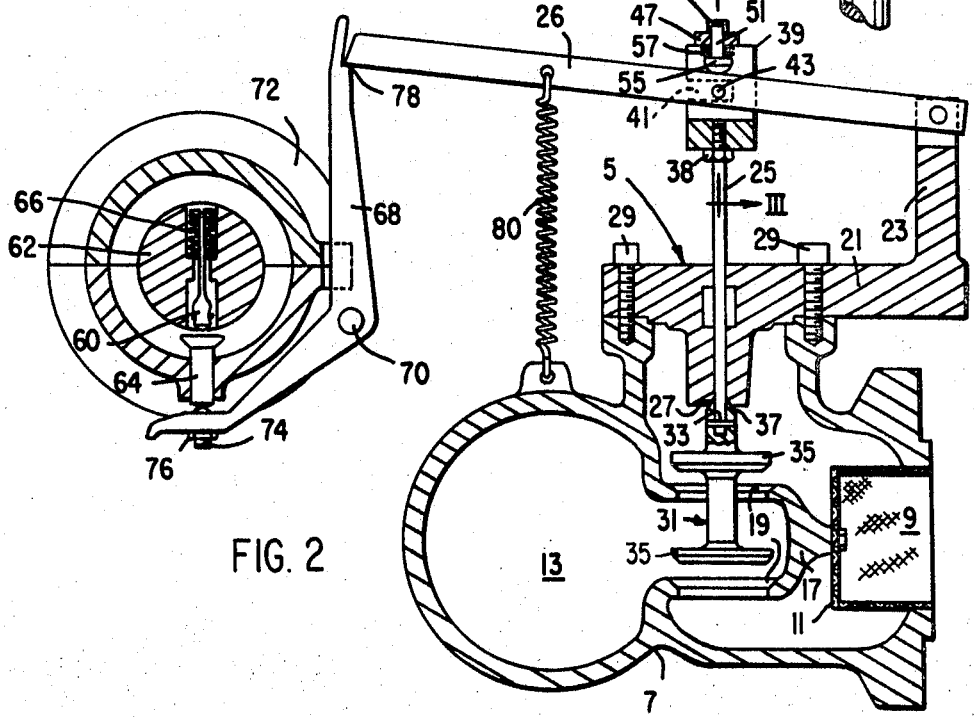
INVENTORS.
CHARLES SHULOCK.
WILLIAM A. STRASLICKA.
BY
James E. Schardt
ATTORNEY.

United States Patent Office 3,465,769
Patented Sept. 9, 1969

3,465,769
GOVERNOR TRIP VALVE WITH TEMPERATURE COMPENSATION MEANS
Charles Shulock, Jeannette, and William A. Straslicka, Norvelt, Pa., assignors to Carrier Corporation, Syracuse, N.Y., a corporation of Delaware
Filed Oct. 2, 1967, Ser. No. 672,191
Int. Cl. G05d 13/04; F01b 25/06
U.S. Cl. 137—31     1 Claim

ABSTRACT OF THE DISCLOSURE

A trip valve for use with a steam turbine for shutting off the steam supply in response to a machine malfunction such as overspeed in which the linkage associated with the trip mechanism includes means assuring a predetermined force against the valve stem despite variations in growth of the parts due to thermal expansion.

BACKGROUND OF THE INVENTION

It is common practice to employ trip valves in the steam supply lines of turbines to shut off the supply of steam in the event of a malfunction causing the turbine to overspeed. These valves are usually provided with a back seat to prevent steam leakage along the stem when the valve is in open position. However, it is difficult to adjust the valve linkages to obtain the proper backseating force on the stem while providing for thermal expansion and contraction of the valve members and linkages.

SUMMARY OF THE INVENTION

This invention relates to a trip valve having a spring biased valve-stem yoke mounted on a pivoted trip beam to exert a backseating opening force on the stem even though the stem and linkages are subjected to thermal expansion and contraction.

BRIEF DESCRIPTION OF THE DRAWINGS

FIGURE 1 is a perspective view of a steam turbine having the trip valve of our invention;
FIGURE 2 is a sectional view of a portion of the turbine and the trip valve; and
FIGURE 3 is an enlarged sectional view taken along line III—III of FIGURE 2.

DESCRIPTION OF THE PREFERRED EMBODIMENT

Referring more particularly to the drawing, there is shown a steam turbine 1 having a governor assembly 3 and a trip valve 5. The trip valve includes a housing 7 having a steam inlet 9 provided with a strainer 11 and an outlet 13 communicating with the turbine steam chest 15. A double partition 17 separates inlet 9 from outlet 13 and has passageways 19 formed therein to provide communication between inlet 9 and outlet 13. The trip valve also includes a cap member 21 having an upstanding portion 23 for pivotally mounting trip beam 26, and a valve seat 27. The cap member is adapted for attachment to housing 7 as by bolts 29. A valve stem 25 extending through cap member 21 is provided with a triple seat disc member 31 which is affixed to one end of the stem by pin 33. Disc portions 35 of disc member 31 are provided for seating engagement with double partition 17 to seal passageways 19 while tapered portion 37 of disc member 31 is adapted for seating engagement with valve seat 27 to prevent flow of steam along stem 25 when the trip valve is open.

A yoke 39, in threaded engagement with valve stem 25 is provided with slots 41 for receiving pin 43 which extends through beam 26 and is held in place thereon by snap rings 45. A yoke cap 47, suitably affixed to yoke 39 as by bolts 49 is provided with an opening 51 therethrough for slidably receiving stem 53 of biasing button 55. Spring means, such as Belleville springs 57 are provided on biasing button stem 53 to press button 55 against beam 26 for urging the yoke and the associated valve stem 25 upward.

The overspeed mechanism, best illustrated in FIGURE 2, comprises an overspeed trip weight 60 mounted in turbine shaft 62 for engagement with actuator pin 64 when the centrifugal force on overspeed trip weight exceeds the restraining force of spring 66, which is provided to maintain weight 60 within shaft 62 under normal operating speeds. Actuator pin 64 is provided for engagement with trip means including lever 68 which is pivoted on pin 70 affixed to a portion 72 of the turbine housing. An adjustment bolt 74 having a lock nut 76 thereon is threaded through lever 68 for adjustable engagement with actuator pin 64. Trip beam 26 rests against a stop or knife edge 78 formed in lever 68. A spring 80 connected between valve housing 7 and beam 26 biases the beam in a downward direction.

Considering the operation of the trip valve and associated mechanism, the valve stem is initially adjusted relative to the yoke and locked in place by lock nut 38 so that when the beam is on the knife edge and tapered portion 37 of disc member 31 is in sealing engagement with valve seat 27, there is a clearance between the lower surface 40 of slot 41 and the lower surface of pin 43, for example 0.04 inch.

The spring biased button will thus exert an upward force on the yoke and stem to keep the valve backseated. As dimensional changes are encountered in the trip mechanism due to thermal expansion or contraction, the spring biased button will provide a relatively constant backseating force on the valve.

If an abnormal condition occurs causing the turbine to overspeed, the overspeed trip weight will push actuator pin 64 outwardly against lever 68 causing lever 68 to pivot about pin 70, freeing beam 26 from knife edge 78 allowing the beam to drop under the influence of spring 80. Under these conditions, pin 43 will press on lower surface 40 of slot 41 to hold disc portions 35 of disc member 31 against the seats formed in partition 17 to seal passageways 19 to stop steam flow to the turbine.

As indicated above, an important feature of this invention involves the slots 41. It is extremely important that the slots have a height, as viewed in FIGURE 3, in excess of the diameter of the pin 43 plus a distance equal to the movement or growth due to thermal expansion of the parts subject to thermal stress. Thus clearance between the yoke 39 and pin 43 may always be maintained and the valve be continuously backseated during operation of the turbine. The arrangement described and illustrated permits continual observation of the slot 41 to assure the presence of the clearance which could otherwise disappear under conditions of extreme wear.

The spring seated trip valve can be easily adjusted and checked by inserting a clearance gauge in the space between the lower surface of the slot and the cross pin disposed therein.

We claim:
1. A trip valve for shutting off flow of motive fluid to a turbine comprising:
   a valve housing having a partition therein with a passageway therethrough;
   a valve stem movably disposed in said housing;
   a disc member associated with said stem adapted for sealing engagement with said housing to prevent motive fluid passage along said stem when said stem is in a first position, said disc member being adapted for sealing engagement with said partition when said stem is in a second position;

a trip beam having one end pivotally mounted on said valve housing;

biasing means urging the other end of said beam towards said housing;

trip means associated with the turbine for positioning the free end of said beam in opposition to said biasing means under normal operating conditions, said trip means being adapted to release the free end of said beam under abnormal operating conditions;

yoke means, adjustably attached to said stem, having opposed slots therein;

pin means attached to said beam, said yoke means being positioned so that said pin means are disposed in slots of said yoke means; and spring means operably associated with said beam and said yoke to maintain a clearance between said pin means and said yoke slots to maintain said disc member in sealing engagement with said housing under normal operating conditions irrespective of thermal expansion or contraction of the said valve stem and associated parts.

References Cited

UNITED STATES PATENTS

| | | | |
|---|---|---|---|
| 567,366 | 9/1896 | Thunderbolt | 137—31 X |
| 2,611,382 | 9/1952 | Kuemmerlein | 137—57 |
| 2,668,556 | 2/1954 | Meyer | 251—330 X |

FOREIGN PATENTS 137,532   6/1950   Australia.

CLARENCE R. GORDON, Primary Examiner

U.S. Cl. X.R.

137—33, 57, 79; 251—330